Figure 5:
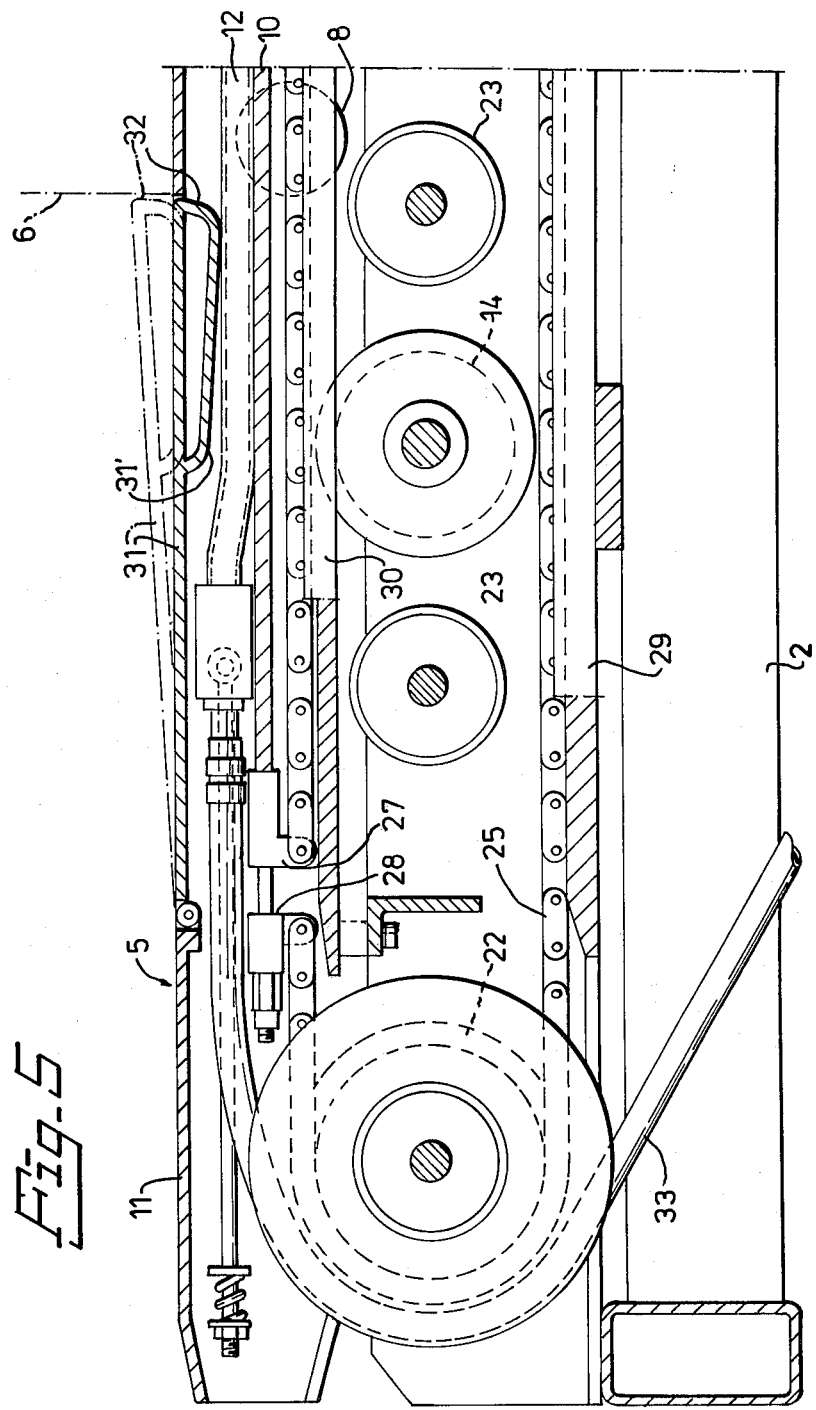

United States Patent [19]

Wirholm et al.

[11] 4,395,183
[45] Jul. 26, 1983

[54] LOADING DEVICE

[75] Inventors: Stig Wirholm, Sollentuna; Sören Berggren, Vallentuna, both of Sweden

[73] Assignee: Tellus Maskin AB, Vallentuna, Sweden

[21] Appl. No.: 243,500

[22] Filed: Mar. 13, 1981

[30] Foreign Application Priority Data

Mar. 17, 1980 [SE] Sweden .................... 8002061

[51] Int. Cl.³ .............................................. B65G 25/00
[52] U.S. Cl. ..................................... 414/416; 198/750
[58] Field of Search ............ 414/392, 399, 416, 499, 414/523, 535, 572, 787; 198/750

[56] References Cited

U.S. PATENT DOCUMENTS 3,213,993 10/1965 Long ............................. 414/499 X
3,853,230 12/1974 Schultz ........................ 414/392 X

*Primary Examiner*—Robert G. Sheridan
*Attorney, Agent, or Firm*—LeBlanc, Nolan, Shur & Nies

[57] ABSTRACT

A loading device (FIG. 4) for loading goods into and unloading goods from a container, comprising a number of lifting beams, for example six, which are supported horizontally in a carrying stand (2), and which are formed of a lower and an upper beam portion (10,11), and a flexible closed hose (12) located between said beam portions, which hose has adjustable air supply for lifting and lowering the upper beam portion (11) relative to the lower beam portion (10). The lower beam portion (10) is provided along its length with vertical lateral flanges (13) standing on peripheries of carrying wheels (14), which are supported on the carrying stand (2), which lateral flanges include running wheels (8) distributed along the flanges, the lowermost portion of the periphery of said running wheels being located at a level lower than the highest portion of the periphery of the carrying wheels (14), so that the portion of the lifting beams which is located above the carrying stand is supported on running wheels, and the portion of the lifting beams which is located outside the carrying stand can be supported by means of the running wheels.

6 Claims, 7 Drawing Figures

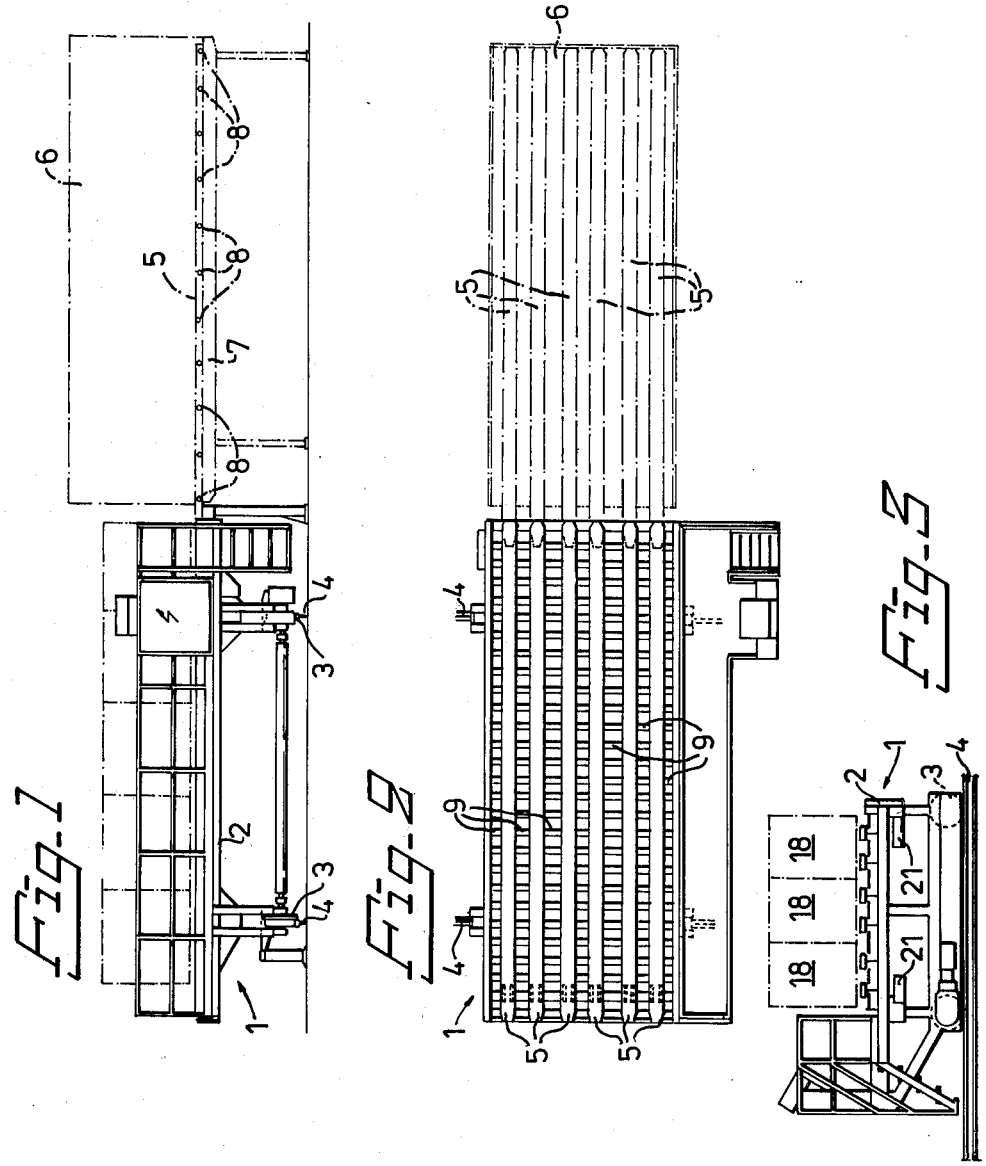

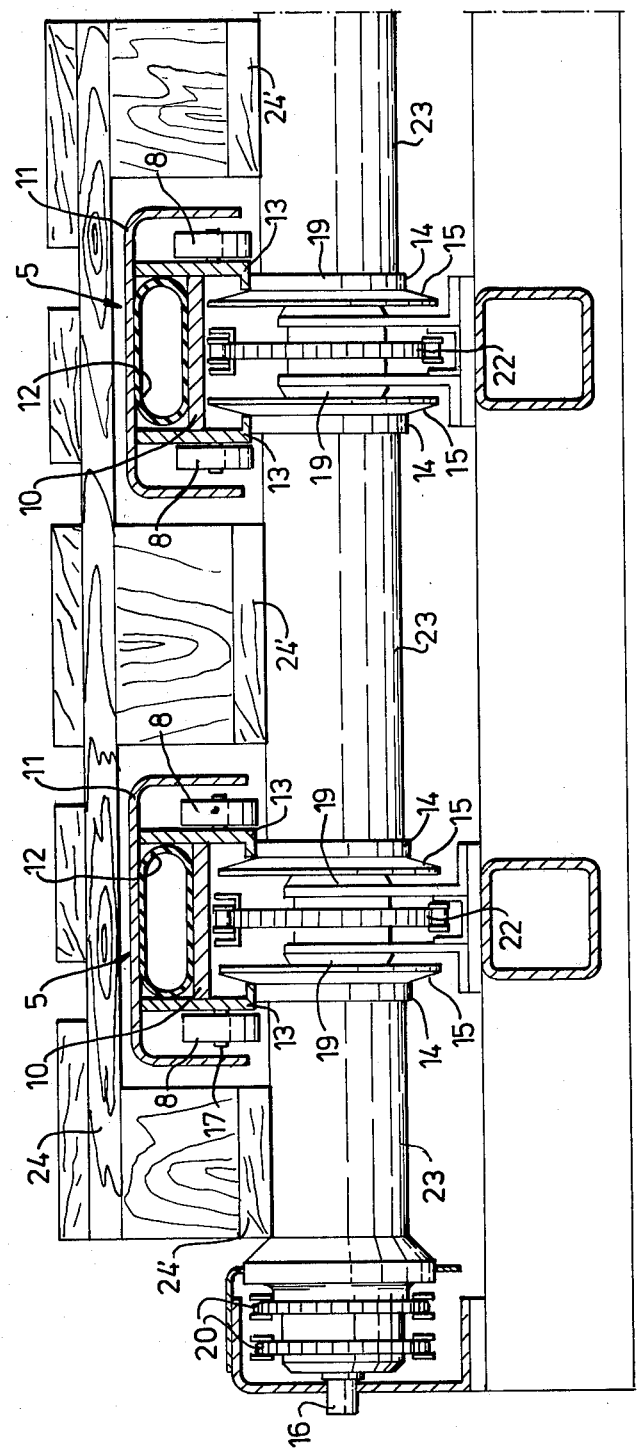

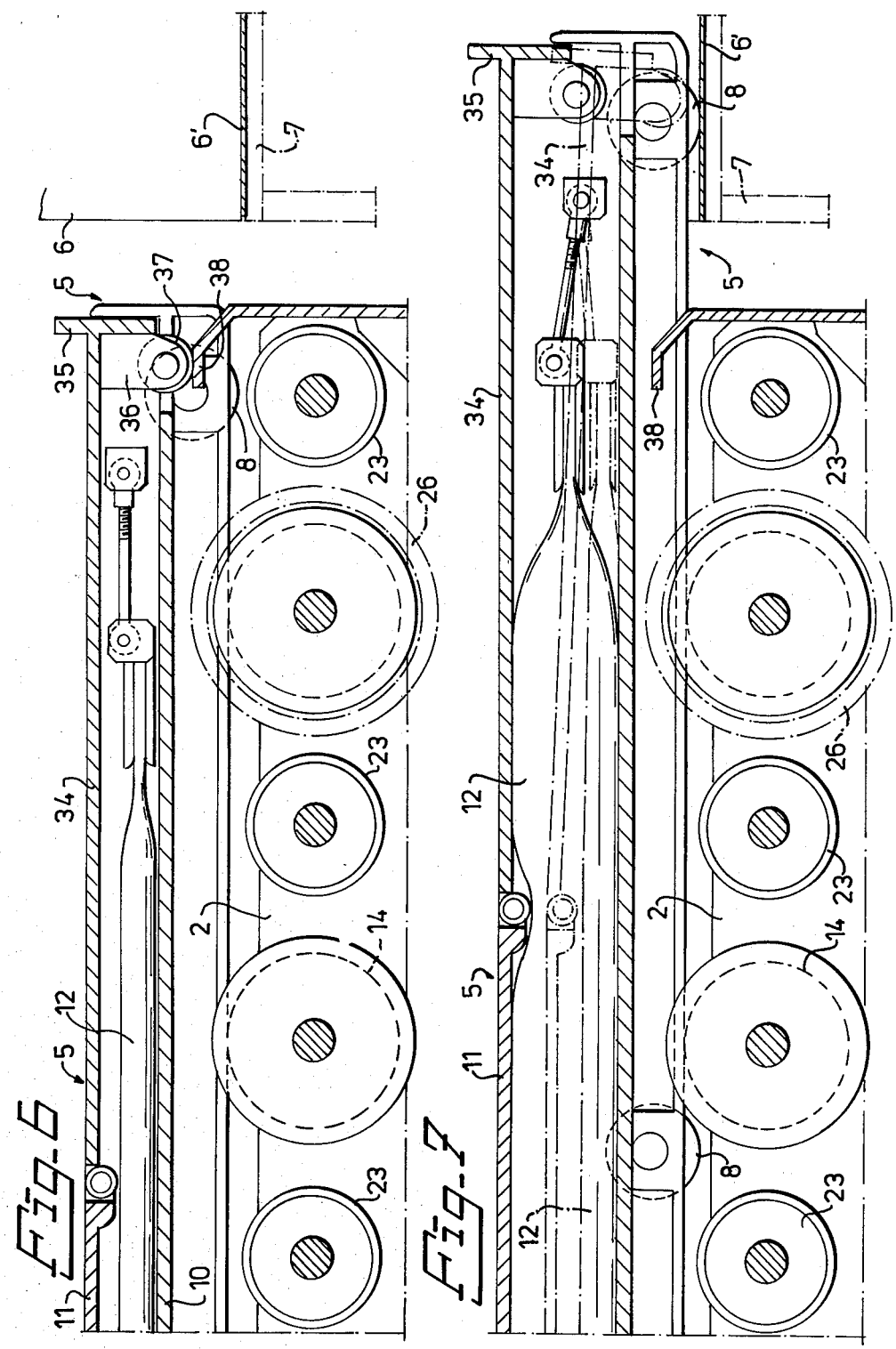

LOADING DEVICE

This invention relates to a loading device for loading and unloading goods into and, respectively, out of containers and similar large-size receptacles, which are accessible through one of the sides thereof.

Containers are used to an ever increasing extent for transporting goods, and especially for their carriage by sea and rail. It is, therefore, desired to reduce as much as possible the time required for the loading and unloading of the containers. Heretofore, loading and unloading usually have been carried out by driving a fork-truck repeatedly into the container for delivering goods into it until the container is filled, or for fetching goods from the container until it is empty. This procedure is relatively tedious in both cases. For this reason, devices also have been proposed which comprise a number of horizontal forks or fingers, which are movable on the device and have such a length, that they provide space for all goods to be transported in a container. The forks with the goods are moved in their longitudinal direction into the container. For unloading the goods from the forks, however, it must be possible to position the goods at a level, which is somewhat higher than the lowest adjustable height of the forks above the container bottom. The bottom, therefore, has to be provided with upwardly open grooves or channels, into which the forks can be inserted and so be lowered that the load is positioned on the upper edges of the grooves. As the container bottom includes such grooves, it is necessary that also at the unloading place of the container which often is far away a precisely similar device must be available, the forks of which are inserted into the grooves for lifting the load off the upper groove edges before it can be removed from the container. The devices proposed so far, and especially the fact that the container bottom must be provided with grooves, involve considerable inconveniencies.

The present invention has the object to produce a loading device, which in practical use operates advantageously and has considerable carrying capacity, and which renders it possible to rapidly and easily load or unload a container of normal type with plane bottom, so that the container can be designed more simply and the loading device must not necessarily be available at the loading and unloading places of the container, but it is sufficient that a normal fork truck, for example, for the loading and unloading of piece-meal goods is provided at one of the places.

This object is achieved according to the present invention by means of a loading device having the characterizing features defined in the attached claims.

The invention is illustrated by an embodiment, which by way of example is shown in the accompanying drawings, in which:

FIG. 1 is a lateral view of the loading device according to the invention and of an indicated container, FIG. 2 is a plan view of the device shown in FIG. 1 and of an indicated container, FIG. 3 is an end view of the device seen from the right in FIG. 1, FIG. 4 shows on an enlarged scale a portion of the device seen from the left in FIG. 1 and partially by section, FIG. 5 is a vertical longitudinal section through a portion of the left-hand end of the device in FIG. 1, FIG. 6 is a vertical longitudinal section through a portion of the right-hand end of the device in FIG. 1, some details being excluded for reasons of greater clarity, and FIG. 7 is a similar longitudinal section as in FIG. 6, but some details being in a position different from that in FIG. 6.

The loading device 1 shown in FIGS. 1-3 and in practical use called container loader, comprises a carrying stand 2 with wheels 3 on rails 4. The carrying stand, however, also may have no wheels and be mounted stationary. On said carrying stand 2 six lifting beams 5 are attached, which are movable in longitudinal direction so that they can be moved simultaneously into a container 6 with plane bottom on a loading platform 7 as indicated by dash-dotted lines in FIGS. 1,2. The lifting means 5 are provided with running wheels 8 for running on the plane container bottom. The stand 2 carries roller ways 9 to the side of the lifting beams 5.

FIG. 4 shows by way of cross-section a pair of lifting beams 5, which consist of a lower beam portion 10 and an upper beam portion 11, both of which extend along the entire longitudinal direction of the lifting means 5. The upper beam portion 11 is connected in a suitable way to the lower beam portion 10, so that it can be lifted and lowered only to a limited extent, but cannot be moved in longitudinal direction relative to said lower portion. Between the beam portions 10,11 a flexible hose 12 is located, one end of which is closed and the other end is connected to a compressed air source. Both ends of the hose 12 are secured with restricted movability on the lower beam portion as shown in FIGS. 6–7. The lifting and lowering of the upper beam portion 11 is effected by controlling the inflation of the hose 12 with compressed air.

The lower beam portion 10 is provided with lateral flanges 13, the lower edge of which rest on carrying wheels 14 and is guided against a lateral flange 15 on each carrying wheel 14. Said carrying wheels 14 are mounted rotatably on horizontal axles, one 16 of which is shown in FIG. 4. The lower beam portion 10 further carries on its vertical sides axle journals 17, which are distributed along said vertical sides, and on which the running wheels 8 freely rotate. The lowermost peripheral portion of said running wheels 8 is located slightly lower than the lowermost surface of the lateral flanges 13 of the lower beam portions 10, and therewith they also are located lower than the highest peripheral portion of the carrying wheels 14, to which portion said flange surface abuts.

The axle 16 is supported on bearings 19 and driven by means of drive chains 20 from motors 21, FIG. 3, which are suspended on the carrying stand 2. On said axle 16 also a sprocket wheel 22 is attached beneath each lifting beam 5, which wheels drive a chain as will be described below.

On said axle 16 also freely rotatable rollers 23 are mounted and are associated with the respective roller way 9, which roller ways are intended to temporarily carry pallets 24, which with their feet 24' stand on the roller ways 9 when the upper beam portion 11 of the lifting beams is sunk down against the lower beam portion 10.

FIG. 5 shows on a scale enlarged relative to FIG. 4 the sprocket wheel 22 close to the rear short side of the carrying stand 2 and a chain 25 laid about the sprocket wheel 22. An additional sprocket wheel 26, FIGS. 6,7, is located close to the opposite forward short side of the carrying stand 2. The chain 25 is secured on the lower beam portion 10 by means of chain mountings 27,28, of which only the mounting 28 is adjustable. The chain strands run in upwardly open grooves 29,30, preferably with bottom linings.

The upper beam portion 11 of each lifting beam 5, in a recess in its upper surface close to its rear end, is provided with a vertically pivotal stop member 31, the stop surface 32 of which faces to the central portion of the lifting beam, i.e. forward. Said stop member 31 includes a portion 31' which rests against the flexible hose 12, in such a manner that, when the hose 12 as shown in FIG. 5 is collapsed, the stop member 31 is located at the same level as the upper surface of the upper beam portion 11, but when the hose 12 by action of compressed air flowing in from a supply hose 33 is rising, the stop member 31 is pivoted upward to the position indicated by dash-dotted lines in FIG. 5, in which position the upper surface of the upper beam portion acts as a stop for goods on the lifting beam.

In FIGS. 6 and 7 substantially only a portion of a lifting beam is shown, viz. its forward end portion, i.e. opposed to the lifting beam end shown in FIG. 5. The upper beam portion 11 also at this end is provided with a recess in its surface, in which recess a vertically pivotal stop dog 34 is located with the stop surface of its dog point 35 facing to the central portion of the lifting beam, i.e. rearward. The stop dog 34 is located with a substantial portion of its length immediately above the flexible hose 12, and it has on the lower surface of its front portion closest to the dog point 35 a supporting arm 36 with a roller 37, which as shown in FIG. 6 rests on a carrying plate 38 supported by the carrying stand 2. By means of said last-mentioned details 36–38, the dog point 35 is maintained projecting upward above the upper surface of the upper beam portion 11, when the lifting beam assumes the position on the carrying stand 2 as shown in FIG. 6. In FIGS. 6 and 7 the entire device is located adjacent a loading platform 7 carrying an empty container 6 with plane bottom 6' which is shown only partially.

In FIG. 6 the lifting beam 5 is located at a distance from the container 6, but in FIG. 7 the lifting beam 5 is shown inserted through a short distance on the container bottom 6', and the flexible hose 12 is inflated whereby the upper beam portion 11 has been lifted through a short distance from the lower beam portion 10 as indicated by fully drawn lines. The hose 12 thereby holds the stop dog 35 raised above the upper surface of the upper beam portion 11 and slightly higher than according to FIG. 6. One of the running wheels 8 (like the other running wheels in the same transverse row) rests on the container bottom 6' and supports the forward end of the lifting beam 5.

In FIG. 7 the hose 12 is indicated by dash-dotted lines in collapsed state after the air pressure therein has dropped. Thereby also the upper beam portion 11 and the stop dog 34 shown by dash-dotted lines have been lowered, so that the uppermost portion of the dog point 35 does not any longer project upward above some portion of the upper or lower lifting beam portions 11,10.

The remaining details in FIGS. 6,7 corresponding to the details in previous Figures have the same reference numerals as in said lastmentioned Figures.

The loading device according to the invention described above can be utilized and function as follows. The load is assumed collected preferably on so-called Europe-pallets having the definite measures 1200×800 mm and definite tolerances. The pallets, besides, are of a good quality and free from skewness, projecting nails, splinters etc. The load further is assumed to form a volume adapted to the inside volume of the container. The lifting beams 5 with their substantially collapsed hoses 12, which results in lowered position of the upper beam portions 11 as well as of their stop members 31,32 and stop dogs 34, are inserted beneath the pallets, whereafter compressed air is supplied to the hoses 12. Thereby the upper beam portions 11 are raised and lift the pallets with the load thereon. Simultaneously the stop members 31,32, FIG. 5, and the stop dogs 34,35, FIG. 7 (fully drawn lines) are raised for retaining the load, so that the lifting beams with their load without risk for the same can be drawn by the chains 25 inward over the carrying stand 2 of the device. The rollers 37 of the stop dogs 34,35, FIG. 6, thereby are supported on the carrying plates 38 when the upper beam portions 11 have been lowered, so that the pallets come to stand on the rollers 23 of the roller ways 9 as shown in FIG. 4. Thereafter the loading device is moved on the rails 4 to the loading platform 7 with its container 6, which is positioned and accurately adjusted relative to the loading device and its lifting beams. When the upper beam portion thereof is in lowered position, compressed air is supplied to the hoses 12, and the upper beam portions together with their stop members and stop dogs are lifted and thereby retain the load, which consists, for example, of fifteen Europe-pallets arranged three pallets wide with goods 18 according to FIG. 3. The inside width of the container, therefore, between the long sides must be at least 2445 mm. The sides must be in parallel and the bottom must be of smooth sheet metal. The sprocket wheels 22 are started, and by means of the chains 25 the lifting beams 5 with their load are moved forward. The carrying wheels 14,15 of the carrying stand 2 thereby support and guide the lifting beams, and when the forward end of the lifting beams is going to be inserted into the container, the running wheels 8 start rolling against the container bottom 6' and support the lifting beam portions projecting from the device with their load.

When the entire load has been inserted into the container 6, the air pressure in the hoses is reduced and thereby the upper beam portions 11 and their stop members 31,32 and stop dogs 34,35 are lowered. The pallets are placed on the container bottom, whereafter the lifting beams are withdrawn from the container and back to the carrying stand 2 by means of the chains 25.

It is also possible to apply the load by piece on the lifting beams when they are drawn back entirely over the carrying stand 2. The pallets with goods are inserted at the rear end of the lifting beams 5, to the left in FIG. 2, and are put down on the roller ways 9, as shown in FIG. 4. The upper beam portion 11 of the lifting beams are lowered, as shown in FIG. 4, in that the flexible hoses 12 do not apply any pressing force. This implies that also the stop members 31, FIG. 5, are in their lower position. The pallets with goods are moved forward on the roller ways 9 until the stop dogs 34,35 folded upward at the forward end of the lifting beams prevent any further forward movement. When the loading has been completed, compressed air is supplied to the hoses 12, which expand so that the upper beam portions 11 are raised, and the stop dogs 34,35 at the forward end of the beams preferably are raised additionally and for their raised position not longer are dependent on support from the carrying plate 38, FIGS. 6,7. The expanded hoses 12 also lift the stop members 31,32 at the rearward end of the lifting beams, and the pallets with goods are locked against forward or rearward movement on the lifting beams 5 and they no longer reach down to the roller ways 9, either. Thereafter the insertion of the load into the container can be effected as described above.

When a loaded container shall be unloaded, the flexible hoses 12 must be so collapsed that the upper beam portion 12 rests on the lower beam portion 10. As soon as the lifting beams have been moved forward so that the roller 37 has left the carrying plate 38, FIG. 6, the stop dog 34 is lowered to the dash-dotted position shown in FIG. 7, and its dog point 35 does not any longer project above the upper beam portion. The lifting beams thereafter are moved into the container beneath the pallets, and by lifting the upper beam portions and their stop members and stop dogs the pallets are lifted off the container bottom, and the entire load is transported over to the carrying stand 2, whereafter the container loader is moved, for example, to a receiving track where the load in its entirety is put down.

The device according to the invention offers particularly the advantages, that a container may have a normal plane bottom and can be filled with goods or be emptied in one operation by the loading device according to the invention, and that each of the lower beam portions of the lifting beams is supported on carrying wheels with stationary position on the carrying stand and can be supported by means of running wheels attached to the vertical sides of the lower beam portion and roll against the container bottom. Hereby the lifting beams need not be high in vertical direction nor be designed very strong for being able to carry loads of heavy weights, for example about 10,000 kg. Furthermore, the fetching of the entire load for a container, its transfer and delivery into the container can be carried out relatively quickly, for example in 4 to 5 minutes. The loading device, further, consists of machine parts which per se are usual, so that the device can be manufactured relatively easily.

The invention must not be regarded restricted to the embodiment described and shown in the drawings, because it can be modified within the scope of the invention. The number of lifting beams, for example, can be varied, and the configuration of the details be modified. The guide means of the lifting beams can consist of sliding surfaces, rollers etc. instead of the flanges on the carrying wheels.

We claim:

1. A loading device for loading and unloading a container or similar receptacle with one side to be opened, comprising: a carrying stand (2), said stand having a plurality of oblong lifting beams (5), each of which along their entire length are formed of a lower beam portion (10) and an upper beam portion (11), and are provided with a flexible closed hose (12) between the beam portions with adjustable air supply for restricted control of the lifting and lowering of the upper beam portion (10), a number rows of carrying of wheels on said stand for carrying the lifting beams (5) and mechanical drive means for moving said beams in longitudinal direction, characterized in that each lower beam portion (10) along its length is provided with vertical side flanges (13), which stand on the periphery of rows of said carrying wheels (14), and running wheels (8) distributed and mounted along the side flanges (13), which running wheels are located entirely free from engagement with the carrying stand (2) and the lowermost portion of their periphery being located at a slightly lower level than the level of the highest portion of the periphery of the carrying wheels (14), whereby the longitudinal stand (2) is supported by the carrying wheels (14), and the portion of the lifting beams (5) projecting outside the carrying stand (2) can be supported by means of said running wheels (8) rolling against a support, such as a container bottom.

2. A device as defined in claim 1, characterized in that the carrying wheels (14) are provided each with a side flange (15), which in horizontal direction form a lateral guide for the side flanges (13) of the associated lower beam portion (10).

3. A device as defined in claim 1, characterized in that said mechanical drive means comprise sprocket wheels (22,26) and chains (25) mounted directly beneath the lifting beams (5).

4. A device as defined in claim 1, characterized in that the end portion of the movable lifting beams (5) which permanently remains over the carrying stand (2) in the upper surface of the upper beam portions (11) includes a recess with a vertically pivotal stop member (31) having a stop surface (32) directed to the central portion of the respective lifting beam, and that the stop member (31) is pivotal upward above the upper surface of the beam portion (11) and downward substantially to the same level as the upper surface by action of the adjacent flexible hose (12) attached between the lower and the upper beam portion.

5. A device as defined in claim 4, characterized in that the lifting beams (5) in their end portion movable outside the carrying stand (2) in the upper surface of the upper beam portions (11) are provided with a recess with a vertically pivotal stop dog (34) having an upstanding dog point (35), the stop surface of which is diposed to face toward the central portion of the respective lifting beam, and that the stop dog (34) and the dog point (35) are pivotal upward above and downward below the upper surface of the beam portion (11) by action of the adjacent flexible hose (12) attached between the lower and the upper beam portion.

6. A device as defined in claim 5, characterized in that the pivotal stop dog (34) on its lower surface has a supporting arm (36) with a roller (37) adapted to temporarily rest on a carrying plate (38) on the carrying stand (2) for adjusting the stop dog (34) substantially to the same level as the upper surface of the beam portion (11) and with the dog point (35) located above said surface.

* * * * *